US012627098B2

(12) United States Patent
Trac et al.

(10) Patent No.: US 12,627,098 B2
(45) Date of Patent: May 12, 2026

(54) INTEGRATED RETRACTABLE GUIDANCE ASSEMBLY FOR DEEP RECESSED PLUGGABLE OPTICAL MODULES

(71) Applicant: Ciena Corporation, Hanover, MD (US)

(72) Inventors: Jennifer Ashley Trac, Nepean (CA); Victor Aldea, Ottawa (CA); Trevor Meunier, Kemptville (CA); Kamran Rahmani, Kanata (CA); Mitchell O'Leary, Ottawa (CA); Yannick Brisebois, Nepean (CA); Cindy Lee, Kanata (CA)

(73) Assignee: Ciena Corporation, Hanover, MD (US)

( * ) Notice: Subject to any disclaimer, the term of this patent is extended or adjusted under 35 U.S.C. 154(b) by 420 days.

(21) Appl. No.: 18/371,508

(22) Filed: Sep. 22, 2023

(65) Prior Publication Data

US 2025/0105556 A1     Mar. 27, 2025

(51) Int. Cl.
*H01R 13/631* (2006.01)
*G02B 6/42* (2006.01)
*H01R 43/00* (2006.01)

(52) U.S. Cl.
CPC ......... *H01R 13/631* (2013.01); *G02B 6/4278* (2013.01); *H01R 43/00* (2013.01)

(58) Field of Classification Search
CPC ..... H01R 13/631; H01R 43/00; G02B 6/4278
See application file for complete search history.

(56) References Cited

U.S. PATENT DOCUMENTS

| | | | | |
|---|---|---|---|---|
| 7,488,123 B2 * | 2/2009 | Chan | .................... | G02B 6/4292 |
| | | | | 385/88 |
| 9,470,859 B2 * | 10/2016 | Arekar | ................. | G02B 6/4292 |
| 2008/0279510 A1 * | 11/2008 | Chan | .................... | G02B 6/4292 |
| | | | | 385/89 |
| 2016/0252691 A1 * | 9/2016 | Arekar | ................. | G02B 6/4261 |
| | | | | 385/92 |
| 2019/0018201 A1 * | 1/2019 | Takano | ................ | G02B 6/4292 |
| 2019/0243072 A1 * | 8/2019 | Takano | ................ | G02B 6/3825 |
| 2020/0271878 A1 * | 8/2020 | Maniloff | .............. | G02B 6/4278 |
| 2025/0105556 A1 * | 3/2025 | Trac | ...................... | H01R 43/00 |

* cited by examiner

*Primary Examiner* — Abdullah A Riyami
*Assistant Examiner* — Nader J Alhawamdeh
(74) *Attorney, Agent, or Firm* — Clements Bernard Walker; Christopher L. Bernard

(57) ABSTRACT

An integrated retractable guidance assembly for guiding insertion of a pluggable optical module into a pluggable optical module cage through an opening in a faceplate of a module, the guidance assembly including: a bullnose structure coupled to the faceplate; and one or more retractable arms extending from the bullnose structure and biased into the opening; where the one or more retractable arms are adapted to allow a rear portion of the pluggable optical module to pass into the pluggable optical module cage without being deflected towards the bullnose structure, but to be deflected towards the bullnose structure as a nose portion of the pluggable optical module passes into the pluggable optical module cage. The retractable arms are adapted to provide a user with tactile alignment feedback when the pluggable optical module is inserted into the pluggable optical module cage through the opening in the faceplate under limited visibility circumstances.

22 Claims, 9 Drawing Sheets

INTEGRATED RETRACTABLE GUIDANCE ASSEMBLY FOR DEEP RECESSED PLUGGABLE OPTICAL MODULES

TECHNICAL FIELD

The present disclosure relates generally to the telecommunications and networking fields. More particularly, the present disclosure relates to an integrated retractable guidance assembly for deep recessed pluggable optical modules (POMs).

BACKGROUND

In telecommunications and networking modules with recessed POM cages, the POMs are typically aligned visually by looking into the faceplate opening of the module during insertion of the POM. However, for modules with faceplate openings that provide limited visibility and those that incorporate graphite-over-foam (GOF) or the like along the sides of the cages, aligning and inserting the POMs may be difficult. For example, the GOF and associated sheet metal coverings may obstruct the view of the cage opening and the compression of the GOF onto the POM body may make it more difficult to adjust the angle and position of the POM during insertion to correct for initial misalignment.

The conventional method for aligning the POMs is to look into the faceplate opening during insertion and carefully insert the POM while aligning the mating end of the plug with the POM cage opening. This can take several attempts to correctly align the POM with the POM cage opening. This may risk damage to the POM if misaligned and a user attempts to force the POM into the POM cage. Thus, a higher level of dexterity re required that may not be reasonably expected from all users.

External tools have been developed to aid in POM alignment during insertion, but require instruction prior to first use and may be misplaced when needed. Further, users may be averse to using loose accessories as they require storage. Thus, such proper use cannot be guaranteed. Further, as the geometries of different faceplate openings vary, different versions of an external tool are required. For a shelf with several different modules installed, it would be impractical to keep multiple different external tools on hand.

The present background is provided as illustrative environmental context only and should not be construed to be limiting in any manner. It will be readily apparent to those of ordinary skill in the art that the principles and concepts of the present disclosure may be implemented in other environmental contexts equally.

BRIEF SUMMARY

The present disclosure provides an integrated retractable guidance assembly that accurately guides a POM into a POM cage with limited faceplate opening visibility and/or with GOF installed without the need for an external tool. This reduces the risk of damaging the POM by ensuring accurate mating between the POM and the POM cage on the first insertion attempt with the alignment angle being constrained. A degree of tactile insertion feedback is also provided to the user. By integrating the guidance assembly into the faceplate, the need to keep track of appropriate external tools is eliminated. Although the integrated retractable guidance assembly is used with recessed POM cages and/or with POM cages incorporating GOF, it may also be used with standard recessed POM cage ports as well.

In one embodiment, the present disclosure provides an integrated retractable guidance assembly for guiding insertion of a POM into a POM cage through an opening in a faceplate of a module, the guidance assembly including: a bullnose structure coupled to the faceplate; and one or more retractable arms extending from the bullnose structure and biased into the opening; where the one or more retractable arms are adapted to allow a rear portion of the POM to pass into the POM cage without being deflected towards the bullnose structure, but to be deflected towards the bullnose structure as a nose portion of the POM passes into the POM cage. The one or more retractable arms include an upper retractable arm adapted to be disposed adjacent to an upper surface of the rear portion of the POM and a lower retractable arm adapted to be disposed adjacent to a lower surface of the rear portion of the POM. The rear portion of the POM is adapted to be disposed between the upper retractable arm and the lower retractable arm. The upper retractable arm is adapted to be deflected towards the bullnose structure as an upper shoulder of the nose portion of the POM contacts the upper retractable arm and the lower retractable arm is adapted to be deflected towards the bullnose structure as a lower shoulder of the nose portion of the POM contacts the lower retractable arm. The one or more retractable arms include one or more pivoting arms, one or more retractable wedges, one or more deflectable struts, one or more deflectable wheels, one or more deflectable bearings, one or more retractable knobs, or one or more retractable protrusions. The one or more retractable arms are biased into the opening by one or more springs. Optionally, the one or more retractable arms are adapted to be deflected into one or more recesses formed in the bullnose structure as the nose portion of the POM passes into the POM cage. As used herein, "left" can be substituted for "upper" and "right" can be substituted to "lower," for example, if a horizontal arrangement is used instead of a vertical arrangement.

In another embodiment, the present disclosure provides a module including: a POM cage; a faceplate defining an opening adapted to receive an inserted POM into the POM cage; and an integrated retractable guidance assembly for guiding insertion of the POM into the POM cage through the opening defined in the faceplate. The guidance assembly includes: a bullnose structure coupled to the faceplate; and one or more retractable arms extending from the bullnose structure and biased into the opening; where the one or more retractable arms are adapted to allow a rear portion of the POM to pass into the POM cage without being deflected towards the bullnose structure, but to be deflected towards the bullnose structure as a nose portion of the POM passes into the POM cage. The one or more retractable arms include an upper retractable arm adapted to be disposed adjacent to an upper surface of the rear portion of the POM and a lower retractable arm adapted to be disposed adjacent to a lower surface of the rear portion of the POM. The rear portion of the POM is adapted to be disposed between the upper retractable arm and the lower retractable arm. The upper retractable arm is adapted to be deflected towards the bullnose structure as an upper shoulder of the nose portion of the POM contacts the upper retractable arm and the lower retractable arm is adapted to be deflected towards the bullnose structure as a lower shoulder of the nose portion of the POM contacts the lower retractable arm. The one or more retractable arms include one or more pivoting arms, one or more retractable wedges, one or more deflectable struts, one or more deflectable wheels, one or more deflectable bearings, one or more retractable knobs, or one or more retractable protrusions. The one or more retractable arms are biased into the opening by one or more springs. Optionally, the one or more retractable arms are adapted to be deflected into one or more recesses formed in the bullnose structure as the nose portion of the POM passes into the POM cage. Optionally, the bullnose structure includes a GOF assembly disposed adjacent to the one or more retractable arms and adapted to contact a side surface of the POM as the POM is inserted into the POM cage. Again, as used herein, "left" can be substituted for "upper" and "right" can be substituted to "lower," for example, if a horizontal arrangement is used instead of a vertical arrangement.

In a further embodiment, the present disclosure provides a method for providing an integrated retractable guidance assembly for guiding insertion of a POM into a POM cage through an opening in a faceplate of a module, the method including: coupling a bullnose structure to the faceplate; and providing one or more retractable arms extending from the bullnose structure and biased into the opening; where the one or more retractable arms are adapted to allow a rear portion of the POM to pass into the POM cage without being deflected towards the bullnose structure, but to be deflected towards the bullnose structure as a nose portion of the POM passes into the POM cage. The one or more retractable arms include an upper retractable arm adapted to be disposed adjacent to an upper surface of the rear portion of the POM and a lower retractable arm adapted to be disposed adjacent to a lower surface of the rear portion of the POM. The rear portion of the POM is adapted to be disposed between the upper retractable arm and the lower retractable arm. The upper retractable arm is adapted to be deflected towards the bullnose structure as an upper shoulder of the nose portion of the POM contacts the upper retractable arm and the lower retractable arm is adapted to be deflected towards the bullnose structure as a lower shoulder of the nose portion of the POM contacts the lower retractable arm. The one or more retractable arms are adapted to provide a user with tactile alignment feedback when the POM is inserted into the POM cage through the opening in the faceplate under limited visibility circumstances. Again, as used herein, "left" can be substituted for "upper" and "right" can be substituted to "lower," for example, if a horizontal arrangement is used instead of a vertical arrangement.

It will be readily apparent to those of ordinary skill in the art that aspects and features of each of the described embodiments may be incorporated, omitted, and/or combined as desired in a given application, without limitation.

BRIEF DESCRIPTION OF THE DRAWINGS

The present disclosure is illustrated and described with reference to the various drawings, in which like reference numbers are used to denote like assembly components/method steps, as appropriate, and in which.

It will be readily apparent to those of ordinary skill in the art that aspects and features of each of the illustrated embodiments may be incorporated, omitted, and/or combined as desired in a given application, without limitation.

DETAILED DESCRIPTION

The integrated retractable guidance assembly of the present disclosure is designed to align a POM into a POM cage that is recessed from the front of the faceplate of a module or circuit pack.

Typically, POM cages are aligned with the front of the faceplate and are visible to a user. The edges of the POM cage are exposed at the front of the faceplate, as such there are few to no difficulties when aligning and inserting the POM into the POM cage since the user can visibly align the POM with the POM cage opening during insertion. When longer-bodied Quad Small Form-Factor Pluggable (QSFP) POMs were introduced, the associated POM cages were necessarily recessed into the faceplate to allow for enough clearance at the nose of the POM to maintain the minimum bend radius of the exiting cables/fibers with the associated shelf door closed. In addition to recessing the POM cages, the opening in the faceplate around the POM cages had to be made large enough to house the larger nose of the POM when fully inserted. Since the top and bottom of the nose of the POM are not the same height relative to the POM cage opening, the POM cage is not centered within the faceplate opening. Thus, the larger, asymmetrical faceplate opening cannot be used to align the POM visually or physically during insertion.

Figure 1:
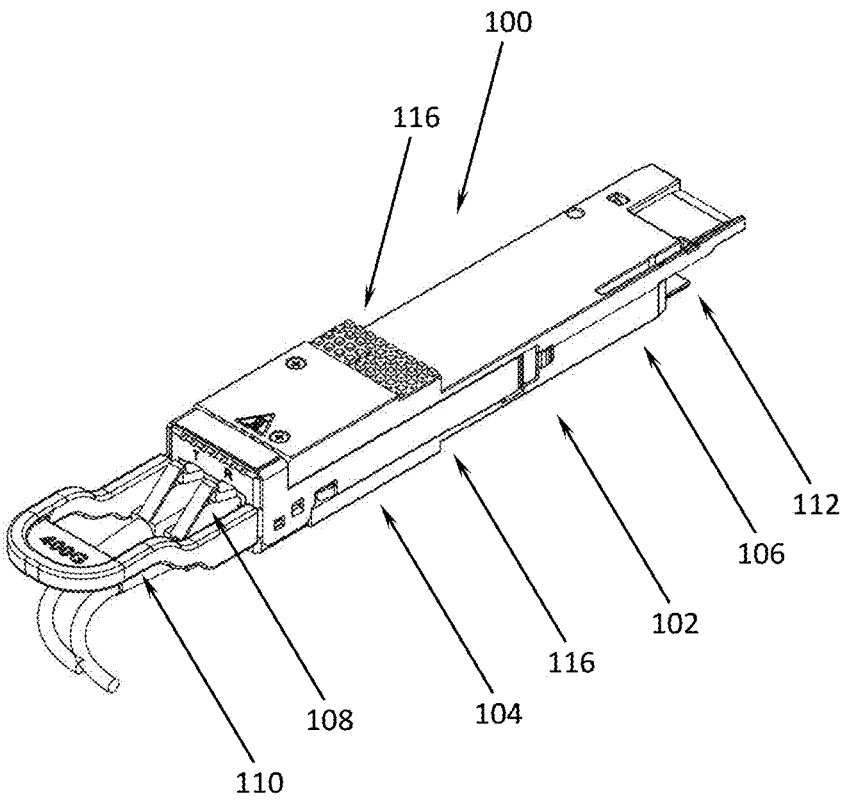
FIG. 1 illustrates a POM utilized in conjunction with the integrated retractable guidance assembly of the present disclosure.
Figure 2:
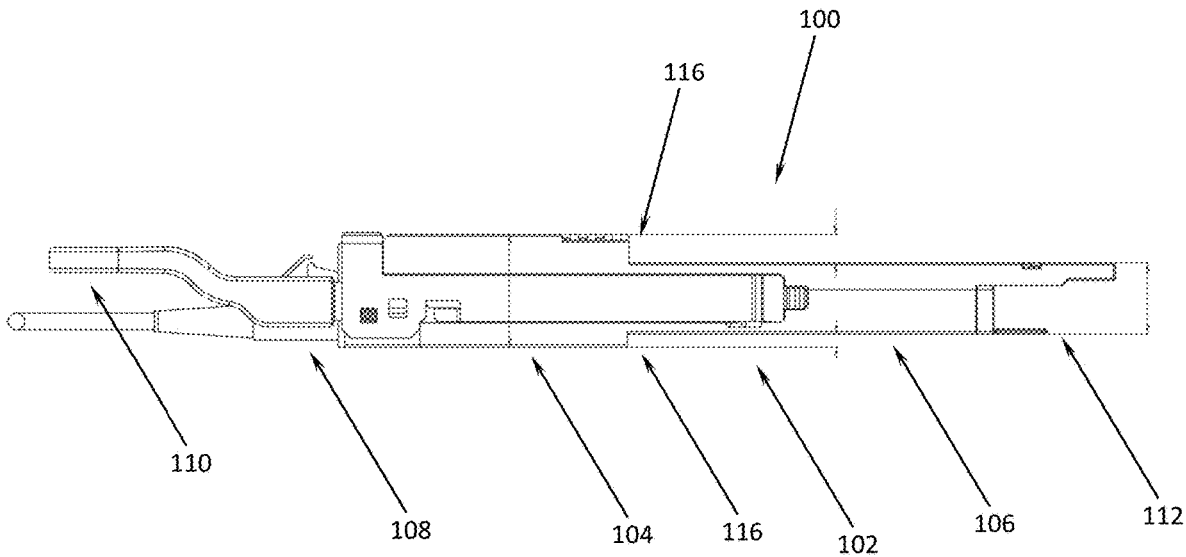
FIG. 2 further illustrates a POM utilized in conjunction with the integrated retractable guidance assembly of the present disclosure.

FIGS. 1 and 2 illustrate a POM 100 utilized in conjunction with the integrated retractable guidance assembly of the present disclosure. As illustrated, the POM 100, which may be a QSFP POM or the like, includes a body 102 having nose portion 104 and a rear portion 106. Cables/fibers 108 are coupled to the nose portion 104 of the body 102, which may also include a handle/guard device 110. A plug 112 is provided at the back of the rear portion 106 of the body 102 for making appropriate connection within the associated POM cage when the body 102 is inserted into the POM cage 102, with the rear portion 106 of the body 102 passing through the opening in the faceplate of the associated module and the nose portion 104 of the body 102 engaging the opening in the faceplate. Other details regarding the engagement of the POM 100 with the opening in the faceplate and the POM cage are not relevant to the integrated retractable guidance assembly of the present disclosure and are thus not described in greater detail.

As illustrated in FIG. 2, the nose portion of the 104 of the QSFP POM 100, which sits in front of the POM cage in the opening of the faceplate, is vertically wider or thicker than the rear portion 106, which is disposed within the POM cage behind the faceplate. Further, the rear portion 106 may be vertically offset from the nose portion 104 in an asymmetrical manner, such that rear portion 106 is shifted downwards relative to the nose portion 104 in the embodiment illustrated. This offset arrangement creates upper and lower shoulders 114 and 116 where the nose portion 104 meets the rear portion 106, roughly corresponding to the opening of the POM cage within the module. It is, in part, this wideness/thickness difference and asymmetry and these shoulders 114 and 116 that make it difficult for a user to accurately align the POM 100 with the POM cage when the POM 100 is inserted into the POM cage, as the POM cage is recessed behind the faceplate of the module and the opening of the faceplate is enlarged to accommodate the nose portion 104 of the body 102 of the POM 100.

Further, due to the high power of newer POMs 100, such as Quad Small Form-Factor Pluggable-Double Dense (QSFP-DD) POMs, a solution has been introduced to transfer heat away from the POM 100 by using the faceplate as a heat spreader. A GOF thermal gasket with a sheet metal covering has been designed to provide enhanced thermal conductivity between the sides of the POM 100 and the faceplate. The GOF is installed on either side of each faceplate opening. When the POM 100 is inserted, the GOF is compressed between the POM 100 and the faceplate opening on both sides of the POM 100. The compression of the GOF creates resistance against the insertion of the POM 100 and makes it more difficult to adjust while attempting to align the mating end of the POM 100 with the recessed POM cage opening. This GOF arrangement is described in greater detail below.

Figure 3:
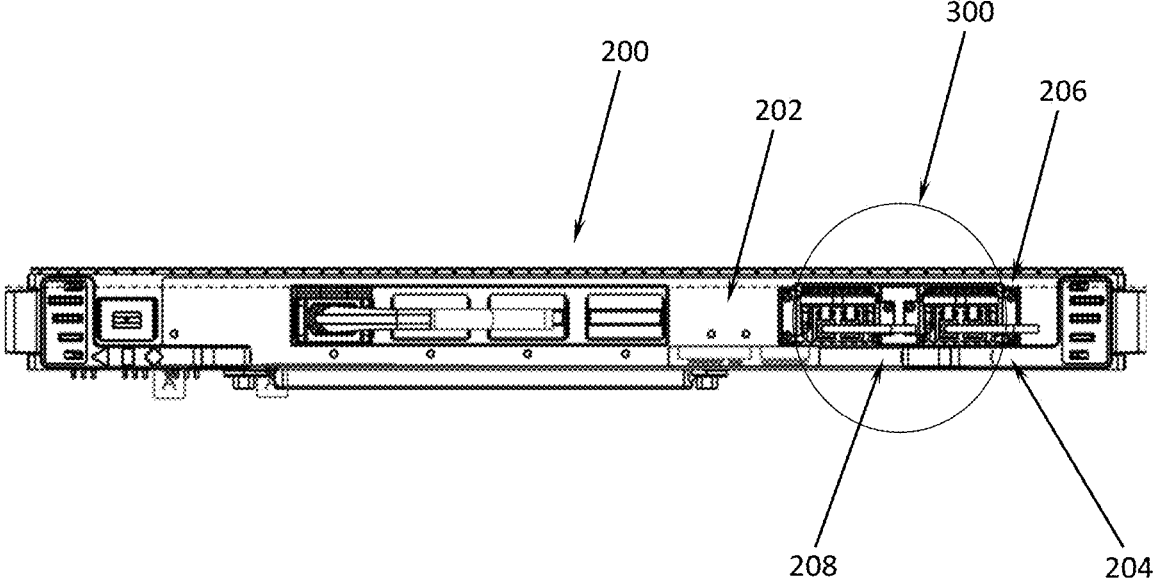
FIG. 3 illustrates a module and faceplate incorporating the integrated retractable guidance assembly of the present disclosure.
Figure 4:
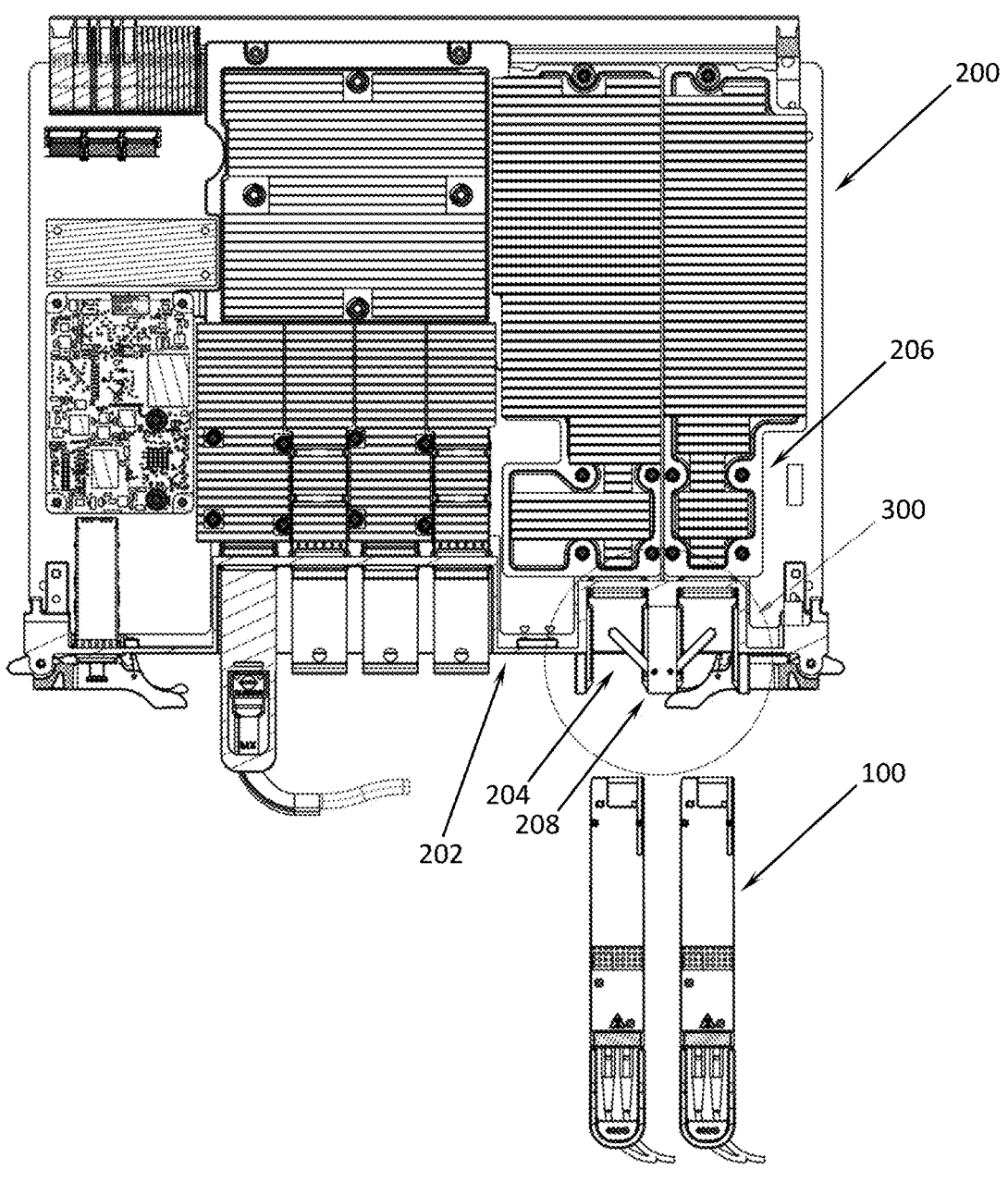
FIG. 4 further illustrates a module and faceplate incorporating the integrated retractable guidance assembly of the present disclosure, as well as two POMs utilized in conjunction with the integrated retractable guidance assembly.

FIGS. 3 and 4 illustrate a module 200 and faceplate 202 incorporating the integrated retractable guidance assembly 300 of the present disclosure. As is illustrated, the faceplate 202 of the module 200 includes openings 204 for receiving POMs 100. When a POM 100 is inserted, the rear portion 106 of the body 102 of the POM 100 passes through the associated opening 204 of the faceplate 202 and engages the associated POM cage 206. When the POM 100 is fully inserted, the nose portion 104 of the body 102 of the POM engages the opening 204 of the faceplate 202, securing the POM 100 to the faceplate 202 and the module 200 and within the POM cage 206. As is also illustrated, the nose portion 104 of the POM 100 is ultimately inserted between bullnose structures 208 coupled to or integrally formed with the faceplate 202 and engaged by the integrated retractable guidance assembly 300 of the present disclosure, which first serves to guide the rear portion 106 of the body 102 of the POM 100 into the POM cage 206 in proper alignment, such that the plug 112 provided at the back of the rear portion 106 of the body 102 makes appropriate connection within the POM cage 206. The integrated retractable guidance assembly 300 may act on one or both sides of each POM 100. A one-side configuration is illustrated in FIGS. 3 and 4, with a central bullnose structure 208 including an integrated retractable guidance assembly 300 for each of adjacent (i.e., left and right) POMs 100. Alternatively, a side bullnose structure 208 could include an integrated retractable guidance assembly 200 for only a single POM 100. Other details regarding the module 200, the faceplate 202, and the POM 100 are not relevant to the integrated retractable guidance assembly 300 of the present disclosure and are thus not described in greater detail, however, is should be noted that the module 200 typically includes multiple POM cages 206, the faceplate 202 is typically integrally formed or assembled from a rigid metallic and/or plastic materials and includes rectangular openings 204, and the POM 100 is typically a prismatic structure also integrally formed or assembled from a rigid metallic and/or plastic materials.

Figure 5:
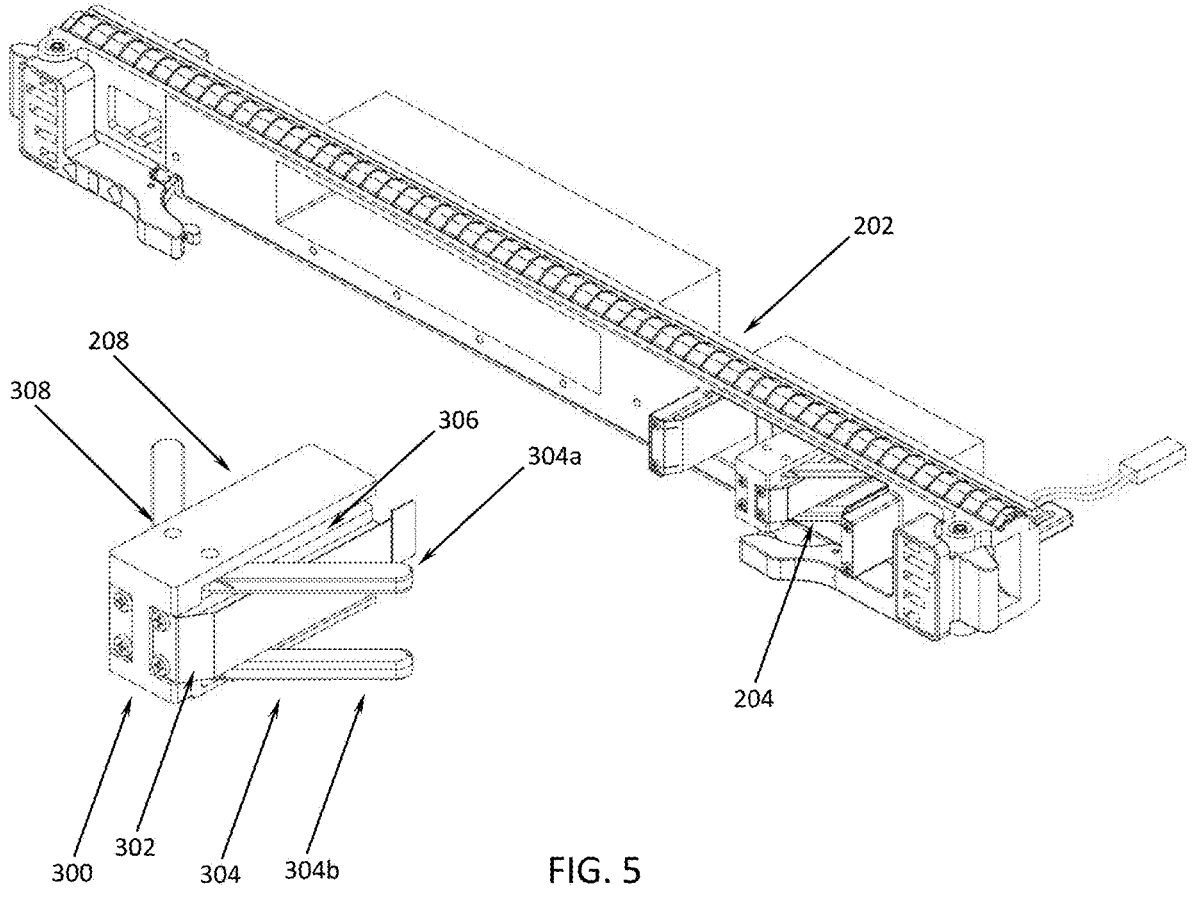
FIG. 5 illustrates the integrated retractable guidance assembly of the present disclosure and its installation into the faceplate and POM cages of a module.
Figure 6:
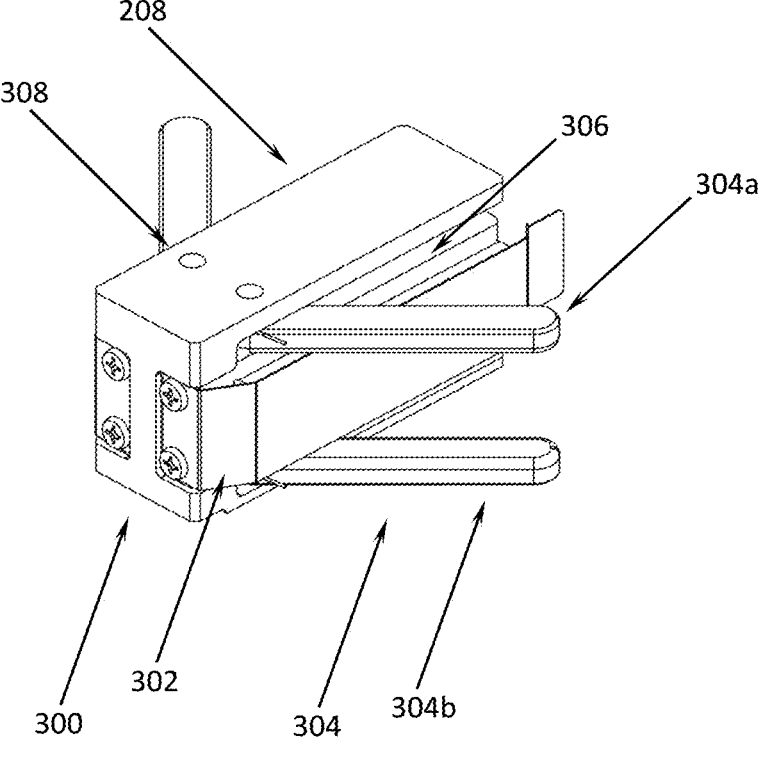
FIG. 6 illustrates one embodiment of the integrated retractable guidance assembly of the present disclosure, incorporating GOF.

FIGS. 5 and 6 illustrate one embodiment of the integrated retractable guidance assembly 300 of the present disclosure, incorporating GOF 302. The bullnose structure 208 is integrally formed with or mounted to the faceplate 202 of the module 200 (or circuit pack), protrudes partially or wholly from the faceplate 202, and houses the components of the integrated retractable guidance assembly 300. An advantage of an integrally-formed bullnose structure 208 is that it limits component count and complexity. An advantage of a mounted bullnose structure 208 is that makes it more convenient to assemble the components of the integrated retractable guidance assembly 300 to the bullnose structure 208 before joining the bullnose structure 208 to the faceplate 202. As mentioned above, the bullnose structure 208, along with other bullnose structures 208 (with or without integrated retractable guidance assemblies 300) are disposed within/form the sides of the POM openings 204 of the faceplate 202 in which the POMs are inserted and secured.

The integrated retractable guidance assembly 300 includes a pair of retractable arms 304 that extend from the bullnose structure 208 into the associated POM opening 204 of the faceplate 202. These retractable arms 304 are vertically spaced apart such that the rear portion 106 of the body 102 of the POM 100 may be disposed between the retractable arms 304a and 304b when the rear portion 106 of the body 102 of the POM 100 is inserted into the POM opening 204. Thus, the retractable arms 304a and 304b serve to constrain and guide the alignment of the rear portion 106 of the body 102 as the rear portion 106 is inserted into the POM opening 204 and between the retractable arms 304a and 304b. Although both an upper retractable arm 304a and a lower retractable arm 304 are illustrated and used in this embodiment, it is possible that only the upper retractable arm 304a may be used as an upper guide under which the rear portion 206 of the POM body 102 is disposed or the lower retractable arm 304b may be used as a lower guide above which the rear portion 206 of the POM body 102 is disposed. In addition to acting as physical insertion guides, the retractable arms 304 advantageously provide tactile feedback as the POM 100 is inserted into the opening 204 of the faceplate 202 under limited visibility conditions. The retractable arms 304 are adapted to deflect towards, and optionally into recesses 306 formed in, the bullnose structure 208 about a pivot point 308 disposed at or near the front portion of the bullnose structure 208. The ends of the retractable arms 304 are biased, via springs or otherwise, into the opening 204 of the faceplate 202 and are pushed into their retracted position adjacent to or in the bullnose structure 208 when the body 102 of the POM 100 is inserted into the POM cage 206 to a degree such that the wider or thicker nose portion 104 and the upper/lower shoulders 114/116 contact the retractable arms 304. This contact gently forces the retractable arms 304 into their retracted positions, again providing a degree of tactile feedback to a user regarding degree of POM insertion into the POM cage 206.

It will be readily apparent to those of ordinary skill in the art that the retractable arms 304 may be replaced with opening-biased, retractable wedges, struts, wheels, bearings, knobs, or like protrusions, provided that such structures act as guides for the rear portion 106 of the body 102 of the POM 100 during the early stages of POM insertion and are deflectable during the later stages of POM insertion when contacted by the shoulders 114 and 116 and nose portion 104 of the body 102 of the POM 100. Some of these alternative protrusions are simply translated into the bullnose structure 208 as opposed to being swept into the faceplate opening 204 and pivoting when actuated.

In the embodiment of FIGS. 5 and 6, the GOF 302 is disposed along the side surface(s) of the bullnose structure 208 between the retractable arms 304, such that the retractable arms 304 do not interfere with the operation of the GOF 302.

Figure 7:
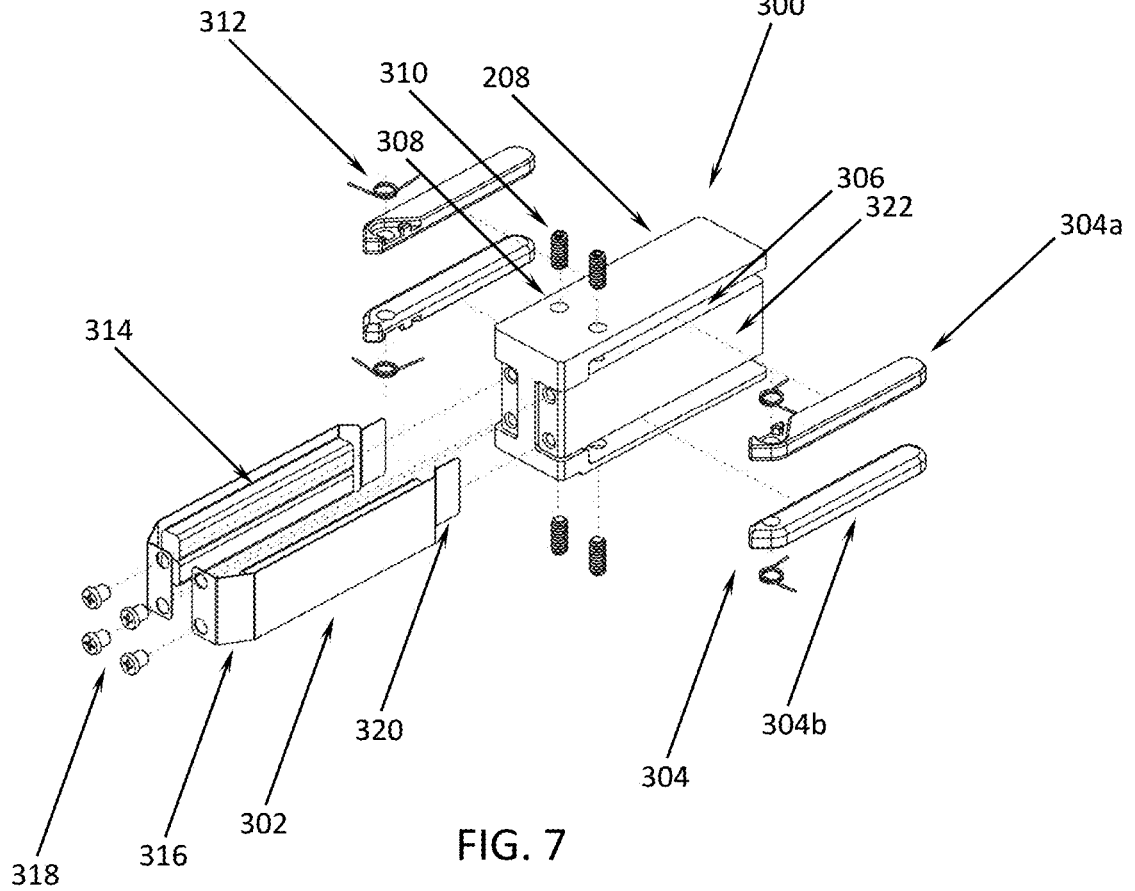
FIG. 7 further illustrates one embodiment of the integrated retractable guidance assembly of the present disclosure, incorporating GOF.

Referring to FIG. 7, in further detail, the integrated retractable guidance assembly 300 again includes the pair of retractable arms 304 that extend from the bullnose structure 208. Each of the retractable arms 304 is an elongate structure manufactured from a rigid metallic or plastic material that may be solid or wholly or partially hollow. These retractable arms 304 are vertically spaced apart such that the rear portion 106 of the body 102 of the POM 100 may be disposed between the retractable arms 304a and 304b when the rear portion 106 of the body 102 of the POM 100 is inserted into the POM opening 204. Thus, the retractable arms 304a and 304b are of sufficient length/size within the POM opening 204 such that they serve to constrain and guide the alignment of the rear portion 106 of the body 102 as the rear portion 106 is inserted into the POM opening 204 and between the retractable arms 304a and 304b. Again, although both an upper retractable arm 304a and a lower retractable arm 304 are illustrated and used in this embodiment, it is possible that only the upper retractable arm 304a may be used as an upper guide under which the rear portion 206 of the POM body 102 is disposed or the lower retractable arm 304b may be used as a lower guide above which the rear portion 206 of the POM body 102 is disposed. In addition to acting as physical insertion guides, the retractable arms 304 advantageously provide tactile feedback as the POM 100 is inserted into the opening 204 of the faceplate 202 under limited visibility conditions. The retractable arms 304 are adapted to deflect towards, and optionally into recesses 306 formed in, the bullnose structure 208 about a pivot point 308 disposed at or near the front portion of the bullnose structure 208 consisting of a pivot pin 310 disposed through a hole disposed through the bullnose structure 208 at the pivot point 308. The ends of the retractable arms 304 are biased via springs 312 disposed around the pivot pins 310 into the opening 204 of the faceplate 202 and are pushed into their retracted position adjacent to or in the bullnose structure 208 when the body 102 of the POM 100 is inserted into the POM cage 206 to a degree such that the wider or thicker nose portion 104 and the upper/lower shoulders 114/116 contact the retractable arms 304. This contact gently forces the retractable arms 304 into their retracted positions, again providing a degree of tactile feedback to a user regarding degree of POM insertion into the POM cage 206.

The GOF 302 is again disposed along the side surface(s) of the bullnose structure 208 between the retractable arms 304, such that the retractable arms 304 do not interfere with the operation of the GOF 302. The GOF 302 includes a compressible GOF pad 314 disposed under a protective sheet metal cover 316 or the like that protects the GOF pad 314 from damage and wear as the POM 100 is inserted into and removed from the opening 204 of the faceplate 202. The sheet metal cover 316 is coupled to the bullnose structure 208 via a plurality of screws 318 or the like at the front end of the bullnose structure 208 and a tab structure 320 or the like at the rear end of the bullnose structure 208, although other suitable connection mechanisms may be used in the alternative. As illustrated, the GOF pad 314 may be disposed within a recess 322 formed in the side of the bullnose structure 208.

Again, the integrated retractable guidance assembly 300 may act on one or both sides of each POM 100. A one-side configuration is illustrated in FIG. 7, with a central bullnose structure 208 including an integrated retractable guidance assembly 300 for each of adjacent (i.e., left and right) POMs 100. Alternatively, a side bullnose structure 208 could include an integrated retractable guidance assembly 200 for only a single POM 100.

Figure 8:
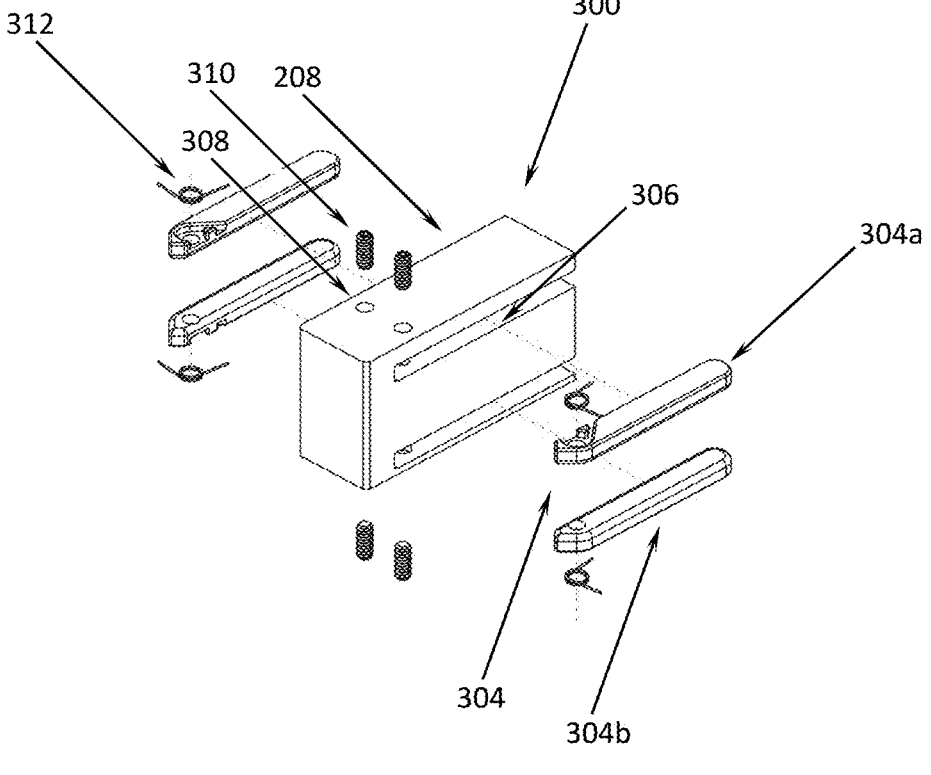
FIG. 8 illustrates another embodiment of the integrated retractable guidance assembly of the present disclosure, not incorporating GOF.

FIG. 8 illustrates another embodiment of the integrated retractable guidance assembly 300 of the present disclosure, not incorporating GOF 302 of FIG. 7. Again, the retractable arms 304 may be replaced with opening-biased, retractable wedges, struts, wheels, bearings, knobs, or like protrusions, provided that such structures act as guides for the rear portion 106 of the body 102 of the POM 100 during the early stages of POM insertion and are deflectable during the later stages of POM insertion when contacted by the shoulders 114 and 116 and nose portion 104 of the body 102 of the POM 100.

Figure 9:
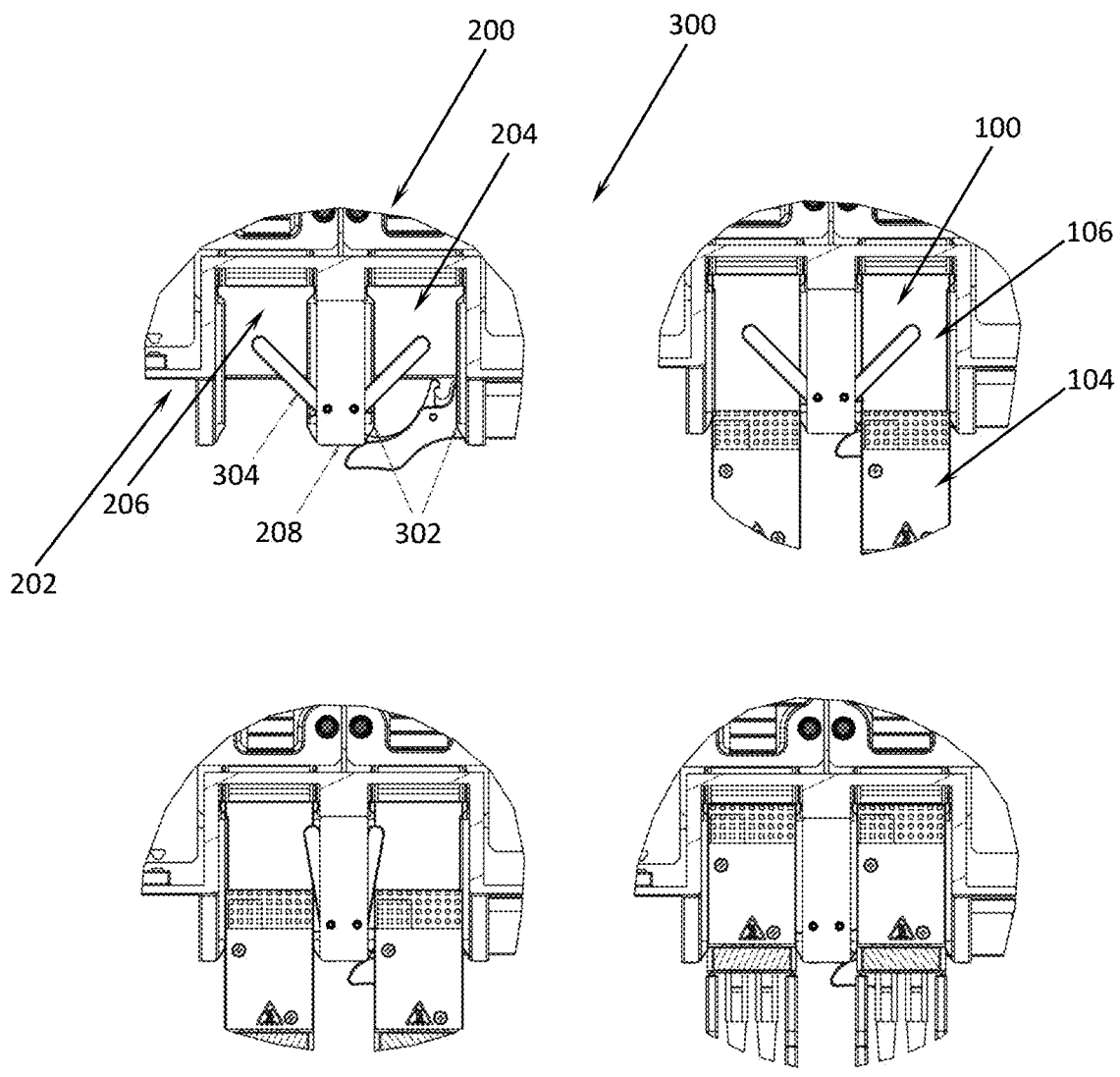
FIG. 9 illustrates the operation of the integrated retractable guidance assembly of the present disclosure, as a POM is inserted into the associated POM cage.

FIG. 9 illustrates the operation of the integrated retractable guidance assembly 300 of the present disclosure, as a POM 100 is inserted into the associated POM cage 206 through the opening 204 of the faceplate 202 of a module 200. Before the POM 100 is inserted between the bullnose structures 208 and the GOFs 302, the retractable arms 304 are fully extended into the opening 204. The retractable arms 304 remain fully extended as the rear portion 106 of the POM 100 is inserted into the opening 204 vertically between the retractable arms 304 that guide the rear portion 106. As the guided POM 100 is inserted further, the retractable arms 304 are partially deflected by contact with the front portion 104 of the POM 100. As the guided POM 100 is inserted fully, the retractable arms 304 are fully deflected by contact with the front portion 104 of the POM 100.

The integrated retractable guidance assembly thus allows for POMs to be aligned and inserted into recessed POM cages with reduced difficulty. Due to the geometry of QSFP and QSFP-DD POMs, it is essential for the such guidance assemblies to be retractable. The assembly must be able to guide the smaller mating end of the POM into the POM cage while making room for the larger nose of the POM when it is fully inserted. The retractable spring-loaded arms thus provide a visual and physical alignment aid without obstructing the mating end of the POM or adding any resistance during POM insertion. Of note, the integrated retractable guidance assembly provides insertion guidance and alignment functionality without compromising the integrity of the Faraday cage of the associated module.

The integrated retractable guidance assembly may be integrated directly into the faceplate assembly of a module or circuit pack. No additional tools, instructions, or installation steps are required by a user to properly insert a POM. The spring-loaded arms physically and visually guide the POM during insertion and ensure proper angle alignment between the POM and POM cage. The spring-loaded arms retract into the bullnose and are not visible when the POM is inserted. Thus, the integrated retractable guidance assembly does not impact the overall look or function of the product. The integrated retractable guidance assembly can be adapted to be used on any module or circuit pack with recessed POM cages. By adjusting the geometry of the bullnose, the integrated retractable guidance assembly can be developed for use on a variety of products. The integrated retractable guidance assembly can be used on both horizontally and vertically oriented circuit packs, as well as on products with and without GOF. For high-volume production, the same spring-loaded arm mechanism can be re-used on different faceplate assemblies when installed into different bullnose parts. The integrated retractable guidance assembly is applicable to any telecommunications product employing high power plugs with a shelf door installed in a central office environment. Thus, the integrated retractable guidance assembly has a very broad range of applicability.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An integrated retractable guidance assembly for guiding insertion of a pluggable optical module into a pluggable optical module cage through an opening defined in a faceplate of a module, the guidance assembly comprising:
a bullnose structure coupled to the faceplate; and
one or more retractable arms extending from the bullnose structure and biased into the opening;
wherein the one or more retractable arms are adapted to allow a rear portion of the pluggable optical module to pass into the pluggable optical module cage without being deflected towards the bullnose structure, but to be deflected towards the bullnose structure as a nose portion of the pluggable optical module passes into the pluggable optical module cage.

2. The guidance assembly of claim 1, wherein the one or more retractable arms comprise an upper retractable arm adapted to be disposed adjacent to an upper surface of the rear portion of the pluggable optical module and a lower retractable arm adapted to be disposed adjacent to a lower surface of the rear portion of the pluggable optical module.

3. The guidance assembly of claim 2, where the rear portion of the pluggable optical module is adapted to be disposed between the upper retractable arm and the lower retractable arm.

4. The guidance assembly of claim 2, wherein the upper retractable arm is adapted to be deflected towards the bullnose structure as an upper shoulder of the nose portion of the pluggable optical module contacts the upper retractable arm and the lower retractable arm is adapted to be deflected towards the bullnose structure as a lower shoulder of the nose portion of the pluggable optical module contacts the lower retractable arm.

5. The guidance assembly of claim 1, wherein the one or more retractable arms comprise one or more pivoting arms, one or more retractable wedges, one or more deflectable struts, one or more deflectable wheels, one or more deflectable bearings, one or more retractable knobs, or one or more retractable protrusions.

6. The guidance assembly of claim 1, wherein the one or more retractable arms are biased into the opening by one or more springs.

7. The guidance assembly of claim 1, wherein the one or more retractable arms are adapted to be deflected into one or more recesses formed in the bullnose structure as the nose portion of the pluggable optical module passes into the pluggable optical module cage.

8. The guidance assembly of claim 1, where the pluggable optical module cage is one or more of recessed behind the faceplate and the opening defined in the faceplate is unsymmetrical such that a view of the pluggable optical module cage from a front of the faceplate is obstructed, making insertion of the pluggable optical module into the pluggable optical module cage through the opening defined in the faceplate difficult.

9. A module comprising:
a pluggable optical module cage;
a faceplate defining an opening adapted to receive an inserted pluggable optical module into the pluggable optical module cage; and
an integrated retractable guidance assembly for guiding insertion of the pluggable optical module into the pluggable optical module cage through the opening defined in the faceplate, the guidance assembly comprising:
a bullnose structure coupled to the faceplate; and
one or more retractable arms extending from the bullnose structure and biased into the opening;
wherein the one or more retractable arms are adapted to allow a rear portion of the pluggable optical module to pass into the pluggable optical module cage without being deflected towards the bullnose structure, but to be deflected towards the bullnose structure as a nose portion of the pluggable optical module passes into the pluggable optical module cage.

10. The module of claim 9, wherein the one or more retractable arms comprise an upper retractable arm adapted to be disposed adjacent to an upper surface of the rear portion of the pluggable optical module and a lower retractable arm adapted to be disposed adjacent to a lower surface of the rear portion of the pluggable optical module.

11. The module of claim 10, where the rear portion of the pluggable optical module is adapted to be disposed between the upper retractable arm and the lower retractable arm.

12. The module of claim 10, wherein the upper retractable arm is adapted to be deflected towards the bullnose structure as an upper shoulder of the nose portion of the pluggable optical module contacts the upper retractable arm and the lower retractable arm is adapted to be deflected towards the bullnose structure as a lower shoulder of the nose portion of the pluggable optical module contacts the lower retractable arm.

13. The module of claim 9, wherein the one or more retractable arms comprise one or more pivoting arms, one or more retractable wedges, one or more deflectable struts, one or more deflectable wheels, one or more deflectable bearings, one or more retractable knobs, or one or more retractable protrusions.

14. The module of claim 9, wherein the one or more retractable arms are biased into the opening by one or more springs.

15. The module of claim 9, wherein the one or more retractable arms are adapted to be deflected into one or more recesses formed in the bullnose structure as the nose portion of the pluggable optical module passes into the pluggable optical module cage.

16. The module of claim 9, wherein the bullnose structure comprises a graphite-over-foam assembly disposed adjacent to the one or more retractable arms and adapted to contact a side surface of the pluggable optical module as the pluggable optical module is inserted into the pluggable optical module cage.

17. The module of claim 16, where compression of the graphite-over-foam assembly as the pluggable optical module is inserted into the pluggable optical module cage creates resistance against insertion of the pluggable optical module into the pluggable optical module cage, making the insertion of the pluggable optical module into the pluggable optical module cage through the opening defined in the faceplate difficult.

18. A method for providing an integrated retractable guidance assembly for guiding insertion of a pluggable optical module into a pluggable optical module cage through an opening defined in a faceplate of a module, the method comprising:

coupling a bullnose structure to the faceplate; and providing one or more retractable arms extending from the bullnose structure and biased into the opening;

wherein the one or more retractable arms are adapted to allow a rear portion of the pluggable optical module to pass into the pluggable optical module cage without being deflected towards the bullnose structure, but to be deflected towards the bullnose structure as a nose portion of the pluggable optical module passes into the pluggable optical module cage.

19. The method of claim 18, wherein the one or more retractable arms comprise an upper retractable arm adapted to be disposed adjacent to an upper surface of the rear portion of the pluggable optical module and a lower retractable arm adapted to be disposed adjacent to a lower surface of the rear portion of the pluggable optical module.

20. The method of claim 19, where the rear portion of the pluggable optical module is adapted to be disposed between the upper retractable arm and the lower retractable arm.

21. The method of claim 19, wherein the upper retractable arm is adapted to be deflected towards the bullnose structure as an upper shoulder of the nose portion of the pluggable optical module contacts the upper retractable arm and the lower retractable arm is adapted to be deflected towards the bullnose structure as a lower shoulder of the nose portion of the pluggable optical module contacts the lower retractable arm.

22. The method of claim 18, wherein the one or more retractable arms are adapted to provide a user with tactile alignment feedback when the pluggable optical module is inserted into the pluggable optical module cage through the opening defined in the faceplate under limited visibility circumstances.

* * * * *